United States Patent
Wu

(10) Patent No.: US 6,293,805 B1
(45) Date of Patent: Sep. 25, 2001

(54) BOARD TO BOARD CONNECTOR

(75) Inventor: Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/549,447

(22) Filed: Apr. 14, 2000

(30) Foreign Application Priority Data

Mar. 3, 2000 (TW) .............................................. 089203416

(51) Int. Cl.[7] .................................................... H01R 12/22
(52) U.S. Cl. ............................................................ 439/66
(58) Field of Search ............................... 439/66, 630, 83, 439/515

(56) References Cited

U.S. PATENT DOCUMENTS

| | | | |
|---|---|---|---|
| 4,362,353 | * 12/1982 | Cobaugh et al. | 439/515 |
| 4,647,124 | * 3/1987 | Kandybowski | 439/515 |
| 5,842,875 | * 12/1998 | Yagi | 439/74 |
| 5,879,169 | * 3/1999 | Wu | 439/74 |
| 5,980,323 | * 11/1999 | Bricaud et al. | 439/630 |
| 5,984,693 | * 11/1999 | McHugh et al. | 439/515 |
| 6,019,611 | * 2/2000 | McHugh et al. | 439/515 |
| 6,027,345 | * 12/1998 | McHugh et al. | 439/66 |

* cited by examiner

*Primary Examiner*—Gary F. Paumen
(74) *Attorney, Agent, or Firm*—Wei Te Chung

(57) ABSTRACT

A board-to-board electrical connector comprises an insulative housing defining an array of channels therethrough and a corresponding number of conductive contacts inserted into the corresponding channels from a top of the housing for protecting soldering portions of the contacts from being damaged and for assuring coplanarity of the soldering portions in assembly. Each channel is defined by two adjacent partitions of the housing and extends through the housing from the top surface to the bottom surface. A pair of latching projections is formed on both sides of each partition. Each contact is used to electrically connect one PC board to another and includes a hook abutting against an underside of two latching projections which project opposite one another in each channel, effectively controlling the height which each contact springs above the housing.

1 Claim, 5 Drawing Sheets

BOARD TO BOARD CONNECTOR

BACKGROUND OF THE INVENTION

The present invention relates to a board-to-board electrical connector, and particularly to a board-to-board connector having contacts which can be accurately located in position in a housing of the connector.

U.S. Pat. Nos. 5,842,875 and 5,879,169, and Taiwan patent application Nos. 81107106 and 83208692 disclose prior art board-to-board or card-to-board electrical connectors. A typical board-to-board electrical connector comprises an insulative housing defining a plurality of channels in opposite sides thereof and a corresponding number of conductive contacts received in the respective channels. Each contact has soldering portions and contacting portions for connecting one printed circuit board to another. In assembly, however, each contact is inserted into a respective channel from a side or bottom of the housing, which exposes the soldering portions of the contacts to being easily damaged, said damage adversely affecting conductive contact between the two printed circuit boards. Furthermore, there is no means in the prior art connector which can ensure the coplanarity of the solder tails of the contacts, therefore, the connector can not be reliably soldered to a printed circuit board by Surface Mounting Technology (SMT). Hence, an improved board-to-board electrical connector is required to overcome the disadvantages of the prior art.

BRIEF SUMMARY OF THE INVENTION

A first object of the present invention is to provide a board-to-board electrical connector having contacts which can be reliably located in position in a housing of the connector;

A second object of the present invention is to provide a board-to-board electrical connector which effectively ensures the coplanarity of soldering portions of the conductive contacts thereof for using SMT.

A board-to-board electrical connector of the present invention comprises an insulative housing defining an array of channels therethrough and a corresponding number of conductive contacts inserted into the corresponding channels from a top of the housing for protecting soldering portions of the contacts from being damaged and for assuring coplanarity of the soldering portions in assembly. Each channel is defined by two adjacent partitions of the housing and extends through the housing from the top surface to the bottom surface. A pair of latching projections is formed on both sides of each partition. Each contact is used to electrically connect one PC board to another and includes a hook abutting against an underside of two latching projections which project opposite one another in each channel, effectively controlling the height which each contact springs above the housing.

Other objects, advantages and novel features of the invention will become more apparent from the following detailed description of the present embodiment when taken in conjunction with the accompanying drawings.

DETAILED DESCRIPTION OF THE INVENTION

Figure 1:
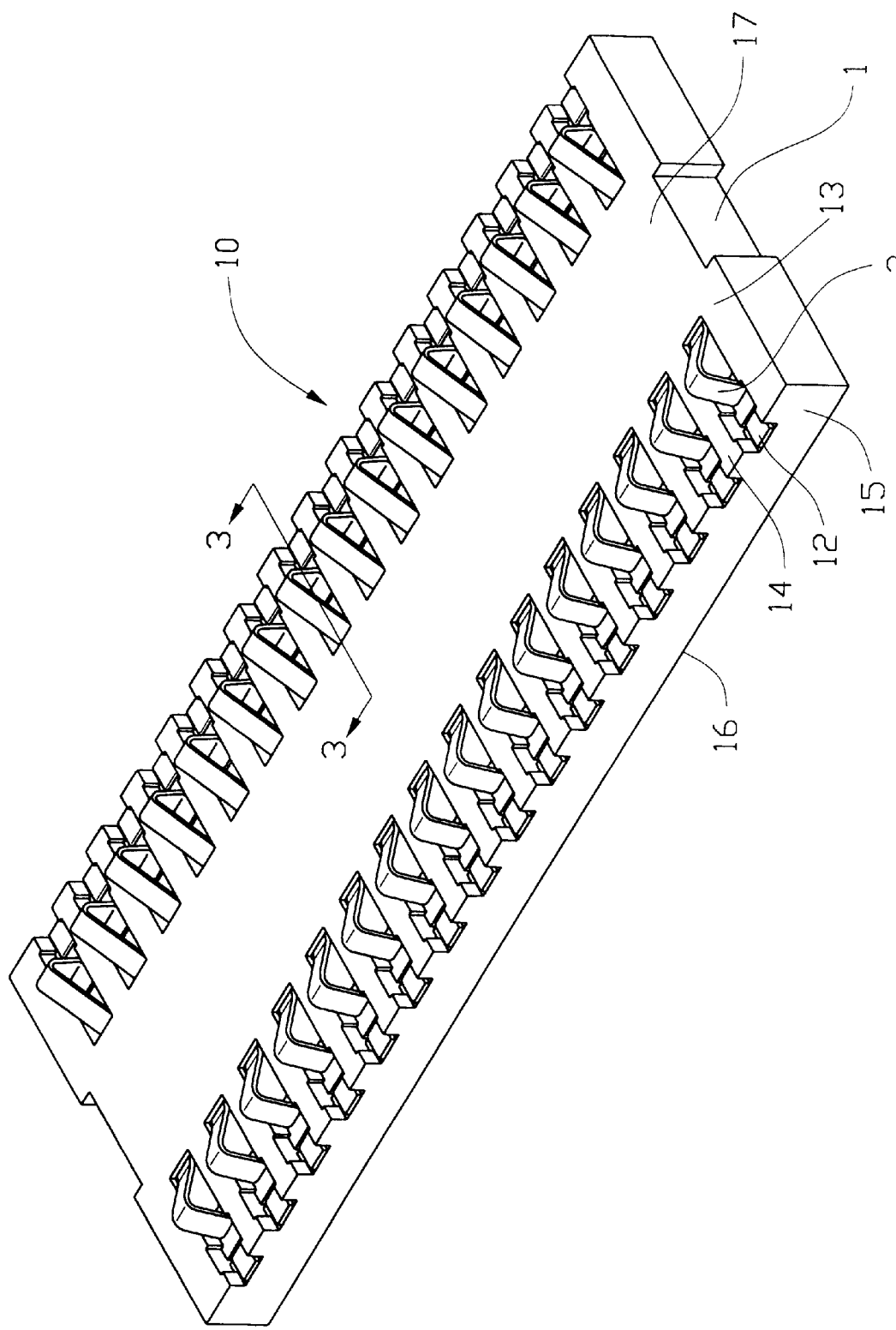
FIG. 1 is an assembled view of a board-to-board electrical connector of the present invention.
Figure 2:
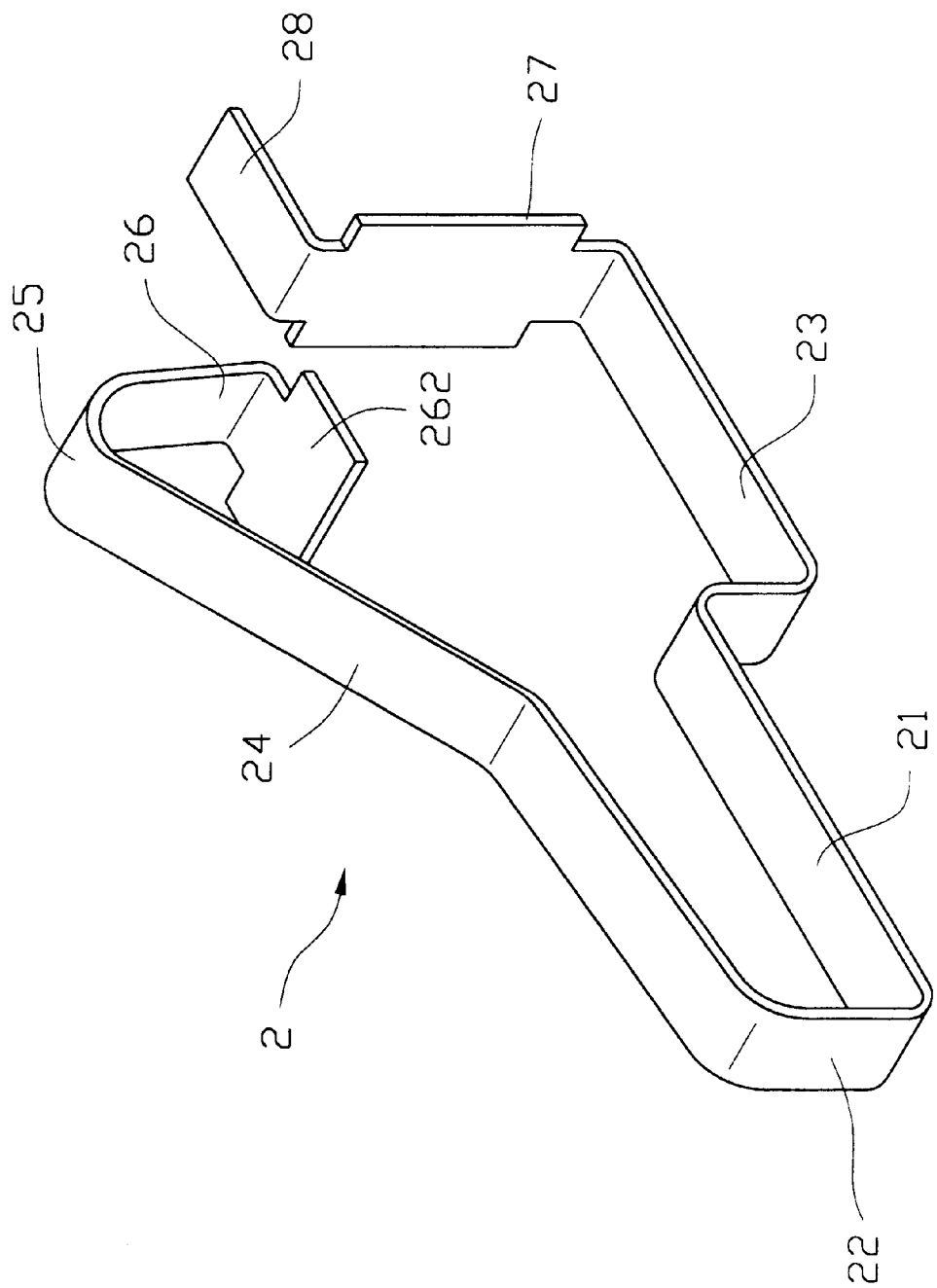
FIG. 2 is a perspective view of a contact of the board-to-board connector of the present invention.
Figure 3:
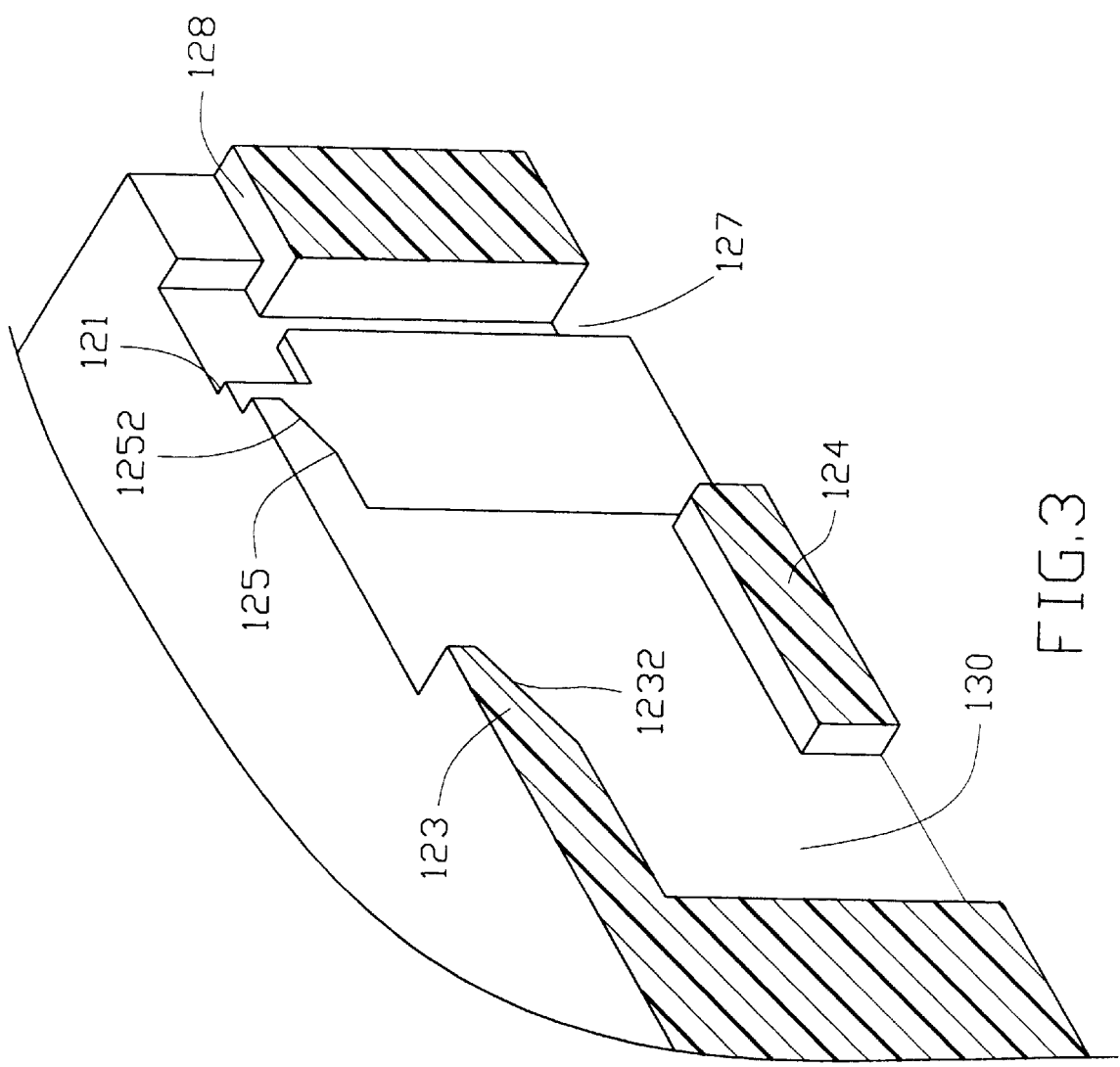
FIG. 3 is a cross-sectional perspective view taken along line 3—3 of FIG. 1 with the contact of the connector removed.

Referring to FIGS. 1 and 2, a board-to-board electrical connector 10 of the present invention comprises an insulative housing 1 and a plurality of conductive contacts 2 received the housing 1. Referring to FIGS. 1 and 3, the insulative housing 1 is rectangular in shape and comprises a top surface 13, a bottom surface 16 and opposite side walls 15. An array of channels 12 is defined through the housing 1, equidistantly spaced apart and in two rows longitudinally extending along opposite sides of the top surface 13, the channels being symmetrically defined about a central portion 17 of the housing 1. Each channel extends through the housing 1 from the top surface 13 to the bottom surface 16. A partition 14 is formed between neighboring channels 12. Referring to FIG. 3, an inward portion 130 of each channel 12 is separated from the top surface 13 by an inner guiding portion 123. A chamfered guiding surface 1232 is formed at a distal side of the inner guiding portion 123 for facilitating insertion of each contact 2 into a corresponding channel 12. Each partition 14 forms on each of its opposite sides a latching projection 125 and a widened recess 121 adjacent the latching projection 125. The projection 125 also forms a second chamfered guiding surface 1252 at a lower end thereof. A slit 127 is defined extending from the widened recess 121 to the bottom surface 16 of the housing 1. Between the inner guiding portion 123 and the latching projection 125, a retaining block 124 extends upward into each channel 12 from the bottom surface 16 of the housing 1 for retaining a respective contact 2. Additionally, a cutout 128 is defined in an upper portion of the side wall 15, aligned with and communicating with each channel 12.

Referring to FIGS. 2 and 3, each conductive contact 2 comprises a horizontal mounting portion 21 at a lower forward end thereof, a curved portion 22 extending from a front end of the horizontal mounting portion 21 and a soldering portion 23 extending downwardly and then rearwardly from a rear end thereof. A resilient portion 24 extends rearward and upward from an upper end of the curved portion 22 and forms an apex 25 at a topmost end which is used to contact a corresponding pad of an upper PC board (not shown) when in use. An L-shaped hook 26 extends downward and then forward from the apex 25 and comprises a widened portion 262 at its distal end. Each contact 2 further forms an enlarged vertical portion 27 projecting upward from a rearward end of the soldering portion 23 and a end portion 28 extending horizontally from an upper end of the vertical portion 27.

Figure 4:
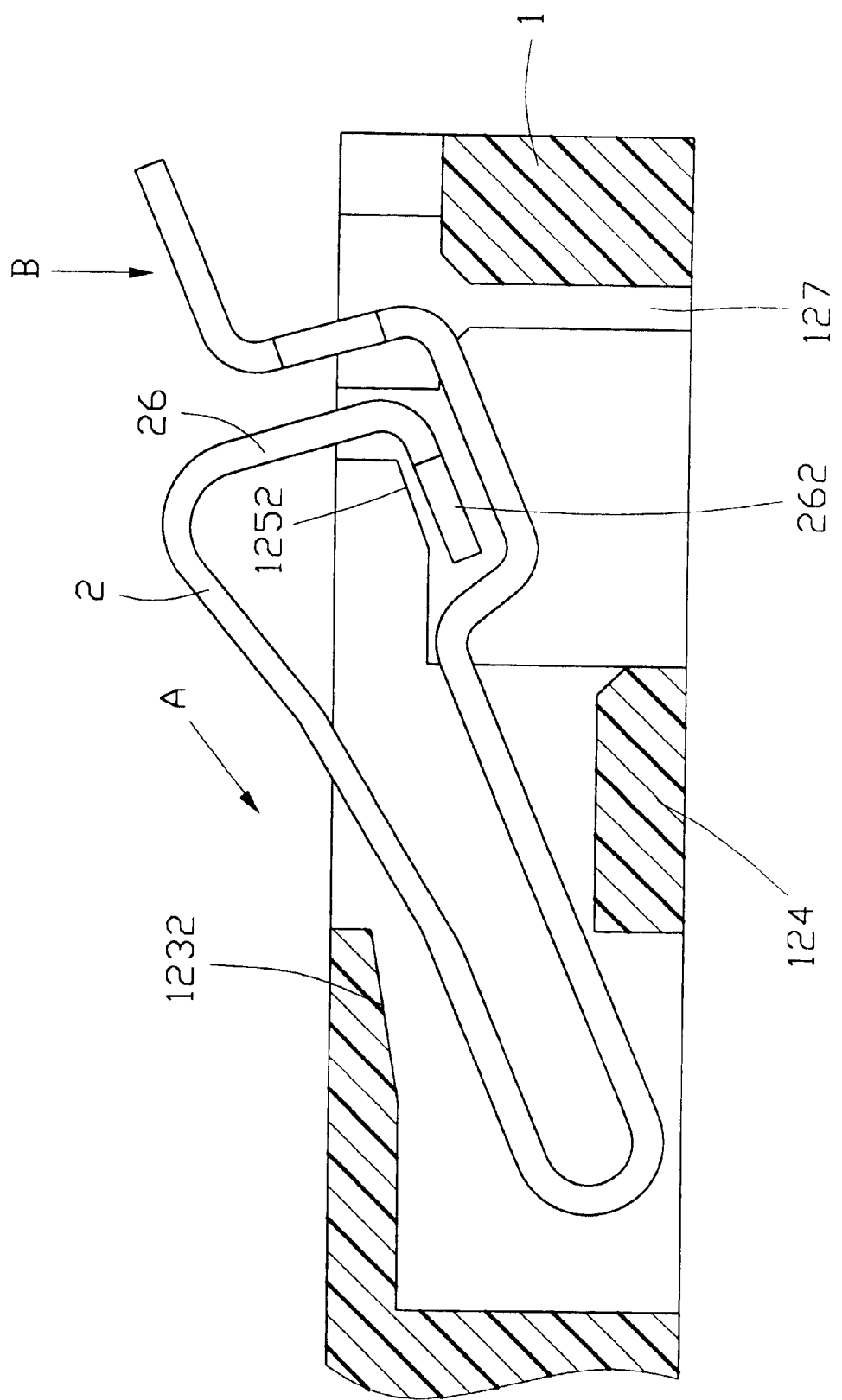
FIG. 4 is a side view of FIG. 3 with a contact partially inserted into the housing.
Figure 5:
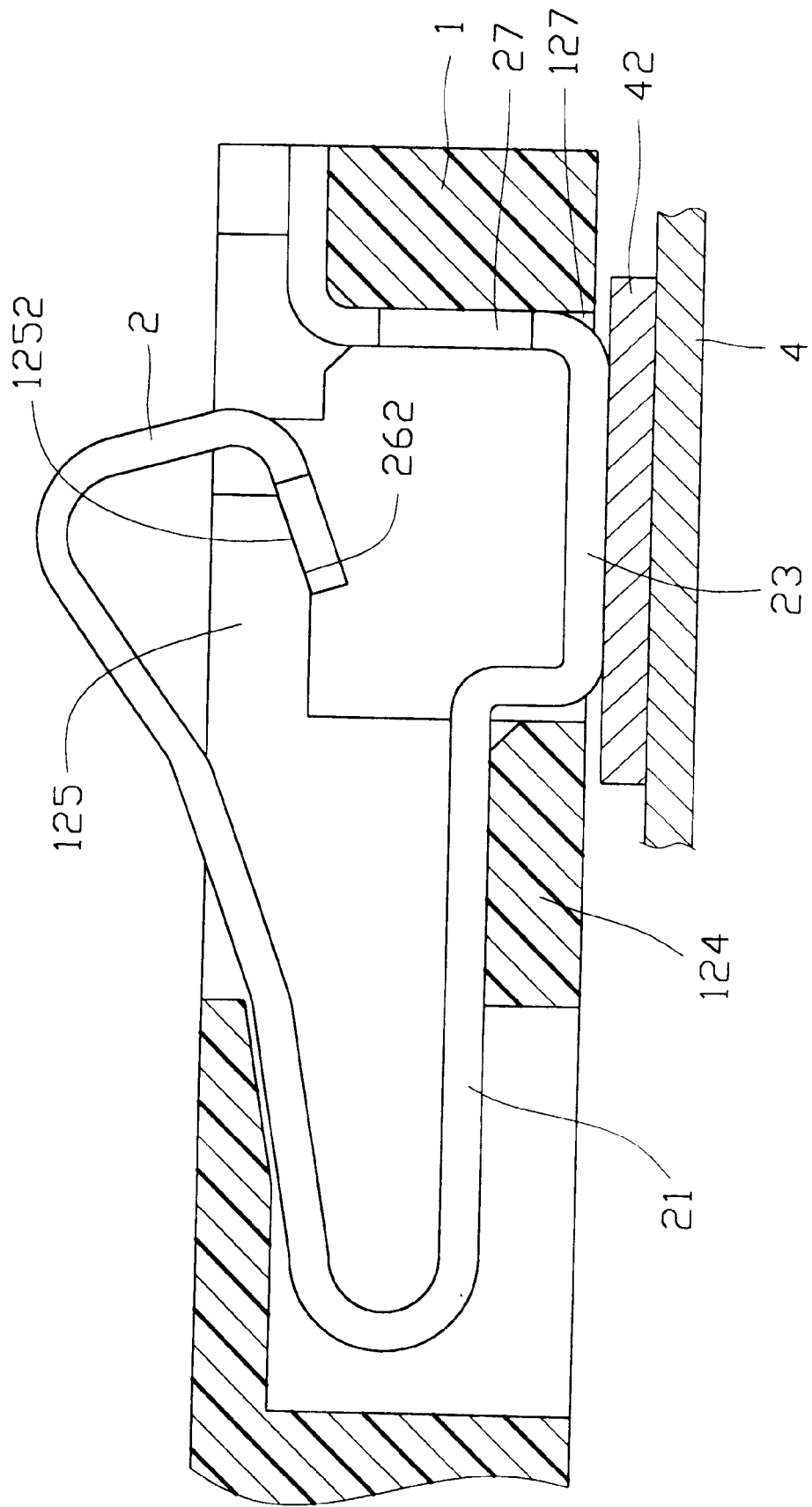
FIG. 5 is a view similar to FIG. 4 with the contact fully inserted into the housing of the connector, and wherein the connector is mounted on a printed circuit board.

In assembly, referring to FIG. 4, each contact 2 is compressibly inserted into a corresponding channel 12 along a direction designated as A with the resilient portion 24 sliding past the chamfered guiding surface 1232 of the guiding portion 123. At the same time, the hook 26 thereof slides past the second chamfered guiding surfaces 1252 of the two facing latching projections 125 which project into each channel 12, and into the channel 12. Referring to FIG. 5, the contact 2 is then pressed into the channel 12 along a downward direction designated as a narrow B in FIG. 4 by pushing inward and downward on the end portion 28 thereof until the contact 2 arrives at its final position. The final position of the contact 2 is achieved with the mounting portion 21 being firmly mounted on the retaining block 124, the vertical portion 27 being firmly retained in two facing slits 127 communicating with the channel 12, and the end portion 28 being firmly retained on a bottom surface of the cutout 128. The firm positioning effectively assures the coplanarity of the soldering portions 23 of the contacts 2. Additionally, the widened portion 262 of the hook 26 abuts against the latching projections 125, effectively controlling the height each contact 2 springs above the top surface 13 of the housing 1. Finally, the bottom surface (not labeled) of the soldering portion 23 thereof, extending beyond the bottom surface 16 of the housing 1, is soldered to a respective pad 42 of a lower PC board 4.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A board-to-board electrical connector comprising:

an insulative housing comprising at opposite sides thereof an array of partitions, a channel defined between each two adjacent partitions and extending through the housing from a top surface to a bottom surface thereof, two latching projections projecting from facing sides of the two adjacent partitions and into the channel, a retaining block extending from the bottom surface of the housing into each channel; and a plurality of contacts being inserted into corresponding channels from a top of the housing and each comprising a curved front end, a mounting portion connected at the lower side thereof the front end for being mounted on the retaining block, a resilient portion extending upwardly and rearwardly from an upper side of the front end and forming an apex extending beyond the top surface of the housing, said apex being adapted to contact an upper printed circuit board, a hook portion downwardly and then forwardly extending from the apex and abutting against an underside of the two latching projections in assembly, a soldering portion extending downwardly and rearwardly from a rearward end of the mounting portion and beyond the bottom surface of the housing for soldering to a lower printed circuit board;

wherein each latching projection forms a chamfered guiding surface at a lower end thereof for facilitating insertion of the hook portion of each contact;

wherein two slits are defined in facing sides of each two adjacent partitions and wherein a vertical portion extends upwardly from a rear end of the soldering portion of each contact and is retained by the slits;

wherein a cutout is defined in an upper portion of each side of the housing, communicating with and aligned with each channel, and wherein an end portion extends horizontally from an upper end of the vertical portion of each contact and is mounted on a bottom surface of the cutout.

* * * * *